United States Patent [19]

Moritugu et al.

[11] Patent Number: 4,644,212
[45] Date of Patent: Feb. 17, 1987

[54] POWER SUPPLY FOR PIEZOELECTRIC-ELEMENT DRIVING DEVICE

[75] Inventors: Mitiyasu Moritugu, Nishio; Hisasi Kawai, Toyohashi; Norihito Tokura, Aichi, all of Japan

[73] Assignee: Nippon Soken, Inc., Nishio, Japan

[21] Appl. No.: 730,580

[22] Filed: May 6, 1985

[30] Foreign Application Priority Data

May 11, 1984 [JP] Japan .................. 59-94918

[51] Int. Cl.$^4$ ............................ H01L 41/08
[52] U.S. Cl. ..................... 310/317; 310/316
[58] Field of Search ............ 310/314, 316, 317, 328; 239/584, 585; 417/383; 123/32 AE, 32 JV

[56] References Cited

U.S. PATENT DOCUMENTS

| | | | |
|---|---|---|---|
| 3,921,015 | 11/1975 | Obeda et al. | 310/317 X |
| 3,995,813 | 12/1976 | Bart et al. | |
| 4,022,166 | 5/1977 | Bart . | |
| 4,044,297 | 8/1977 | Nobue | 310/317 X |
| 4,237,399 | 12/1980 | Sakamoto | 310/317 |
| 4,258,282 | 3/1981 | Rijkaert | 310/317 |
| 4,471,256 | 9/1984 | Igashira et al. | |
| 4,507,762 | 3/1985 | Meyer et al. | 310/317 X |

FOREIGN PATENT DOCUMENTS 58-18183  6/1982  Japan .
5910178  7/1982  Japan .
59-54772  3/1984  Japan .

Primary Examiner—Mark O. Budd
Attorney, Agent, or Firm—Cushman, Darby & Cushman

[57] ABSTRACT

A piezoelectric element driving device applicable to an actuator portion of a fuel injection valve for an internal combustion engine, including a first switching unit, operating to generate a first set voltage in response to a first signal transmitted at predetermined intervals, and a second switching element, operating to generate a second set voltage in response to a second signal transmitted after a predetermined period of time upon completion of the operation of the first switching element. There are provided a unit for regulating the first and second set voltages by means of rectifying devices arranged between the first and second switching elements and a piezoelectric element, and a resonance coil connected between connecting points of the first and second switching elements and the rectifying devices.

5 Claims, 4 Drawing Figures

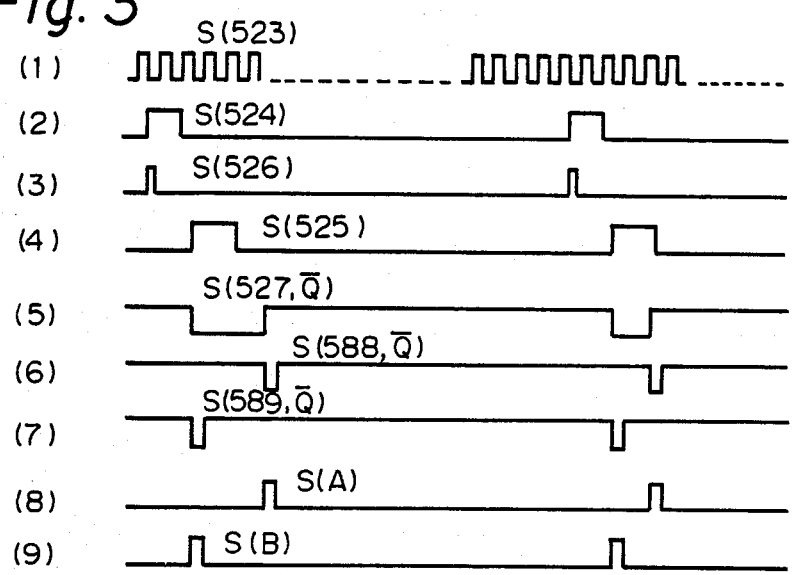
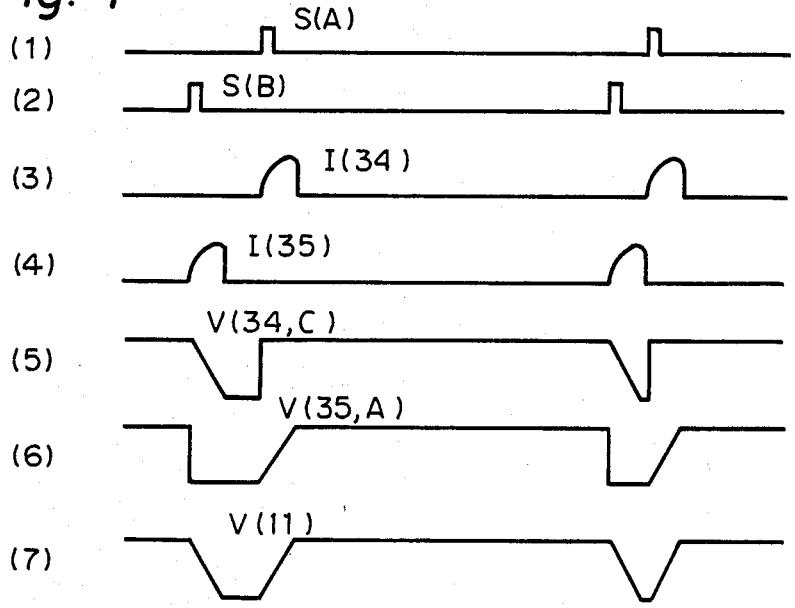

POWER SUPPLY FOR PIEZOELECTRIC-ELEMENT DRIVING DEVICE

BACKGROUND OF THE INVENTION (1) Field of the Invention

The present invention relates to a device for driving a piezoelectric element which is used, for instance, as an actuator portion of a fuel injection valve applied for an internal combustion engine of an automobile.

(2) Description of the Related Art

It has been known to use a piezoelectric element, for instance, PZT (55% PbZrO$_3$ and 45% PbTiO$_3$), as an actuator for a valve such as a fuel injection valve, and a pump such as a fuel injection pump in which the actuator is required to have a certain stroke. In a circuit for driving the piezoelectric element used for such an actuator, it is known to use transistors or thyristors.

If a PZT piezoelectric element is applied as an actuator for a valve or pump, it is necessary to apply a voltage of several hundred volts to the PZT piezoelectric element, which is therefore applied with electric current of several tens of amperes.

If transistors are used for a circuit for such an actuator, the transistors must be of a high-voltage and large-current type, which are very expensive. Thyristors, which were originally developed for use for high-voltage and large current purposes, may be suitable for a circuit driving an actuator including a PZT piezoelectric element. However, when a coil is used for commutating the thyristors, the PZT piezoelectric element is applied with a negative voltage and suffers from adverse effects due to polarization.

SUMMARY OF THE INVENTION

In view of the problems in the prior art, an object of the present invention is to realize proper driving of a piezoelectric element, wherein the deterioration of the properties of the piezoelectric element due to a polarization caused by the application of negative voltage is prevented.

In order to attain such an object, the present invention provides a piezoelectric element driving device including a first switching element operating in response to a first signal, means for applying a first set voltage to a piezoelectric element in response to the operation of the first switching element, a second switching element operating in response to a second signal which is transmitted after a predetermined period of time upon completion of the operation of the first switching element, means for applying a second set voltage to the piezoelectric device in response to the operation of the second switching element, and means for regulating the first and second set voltages by means of rectifying devices which are arranged between the first and second switching elements respectively and the piezoelectric element.

BRIEF DESCRIPTION OF THE DRAWINGS

FIG. 3 is a waveform diagram of the signal waveforms of the gate trigger circuit; and FIG. 4 is a waveform diagram of the signal waveforms of the driving circuit portion for the piezoelectric element.

DESCRIPTION OF THE PREFERRED EMBODIMENTS

One embodiment of the present invention is now explained by reference to the drawings.

Figure 1:
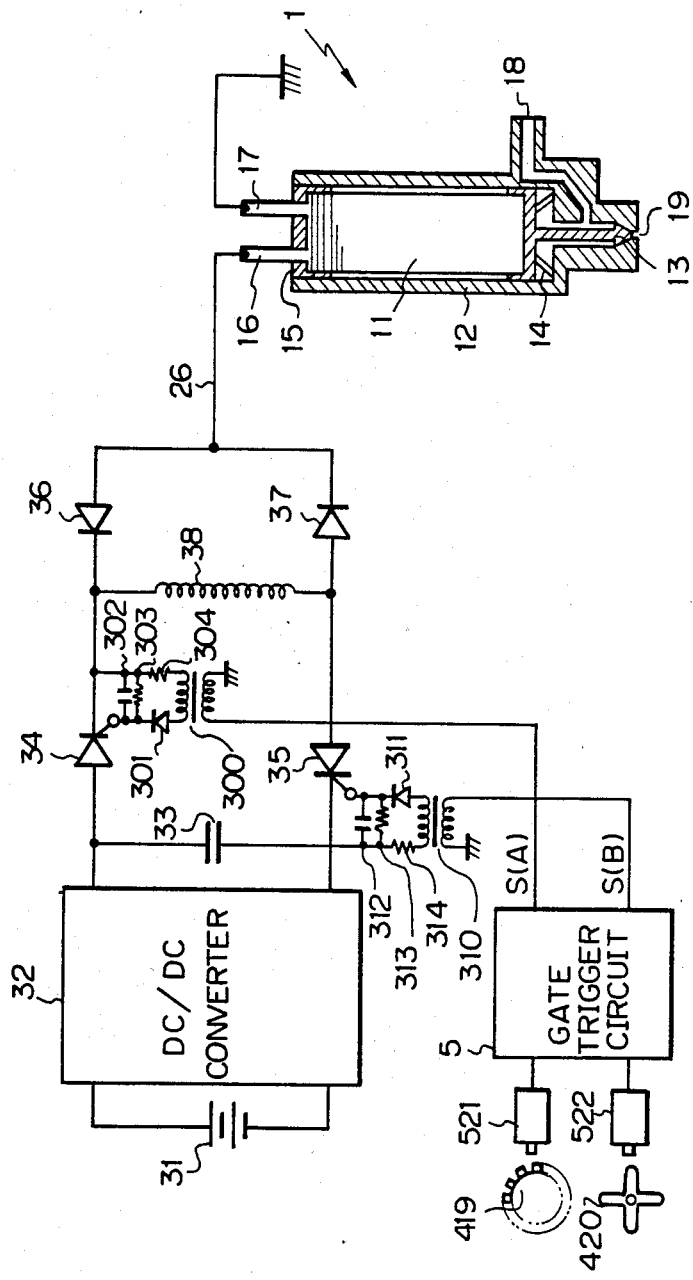
FIG. 1 is a circuit diagram of one embodiment according to the present invention, in which a piezoelectric element is used for a fuel injection apparatus.

FIG. 1 shows a fuel injection valve 1 utilizing a piezoelectric element such as a PZT. The numeral 12 represents a housing in which a piezoelectric element 11 is arranged. The piezoelectric element 11 is constituted by laminating a plurality of plate-like piezoelectric element units, between each of which a paste-like electrode is coated. One end of the piezoelectric element 11 is fixed by means of a stopper 15 which is fit to the upper end of the internal wall of the housing 12, and the other end is provided with a needle valve 13. A plate spring 14 is arranged on the needle valve 13 connecting side in the receiving part of the housing 12 enclosing the piezoelectric element 11. The piezoelectric element 11 has a lead wire 16 for a terminal (+) and a lead wire 17 for a terminal (−). The lead wires are connected to electrodes located between every plate-like piezoelectric element unit. The housing 12 is provided with a fuel intake 18 and a fuel injection outlet 19 in one body.

The needle valve 13 is so constituted that it will close the injection outlet 19 when a positive voltage of predetermined value or more is applied to the piezoelectric element 11 to extend the piezoelectric element 11, and that it will open the injection outlet 19 when the applied voltage is decreased less than the predetermined value to enable the return force of the plate spring 14 to work. Fuel is applied with pressure by a fuel pump and flows into the fuel intake 18. While the fuel injection outlet 19 is open, the pressurized fuel is sprayed in mist therefrom.

In the driving circuit of the piezoelectric element 11 shown in FIG. 1, the numeral 31 stands for a DC power source consisting of a battery, the numeral 32 for a known DC—DC converter for increasing the voltage of the battery (for instance of 12 V) up to about 300 V, the numeral 33 for a capacitor for storing the energy of the DC—DC converter 32 to maintain the voltage of the DC—DC converter 32 as it is if a below-mentioned instantaneous large current flows, the numerals 34 and 35 for thyristors, the numerals 36 and 37 for diodes, the numeral 38 for a resonance coil, and the numerals 300 and 310 for pulse transformers for triggering the gates of thyristors 34 and 35.

Figure 2:
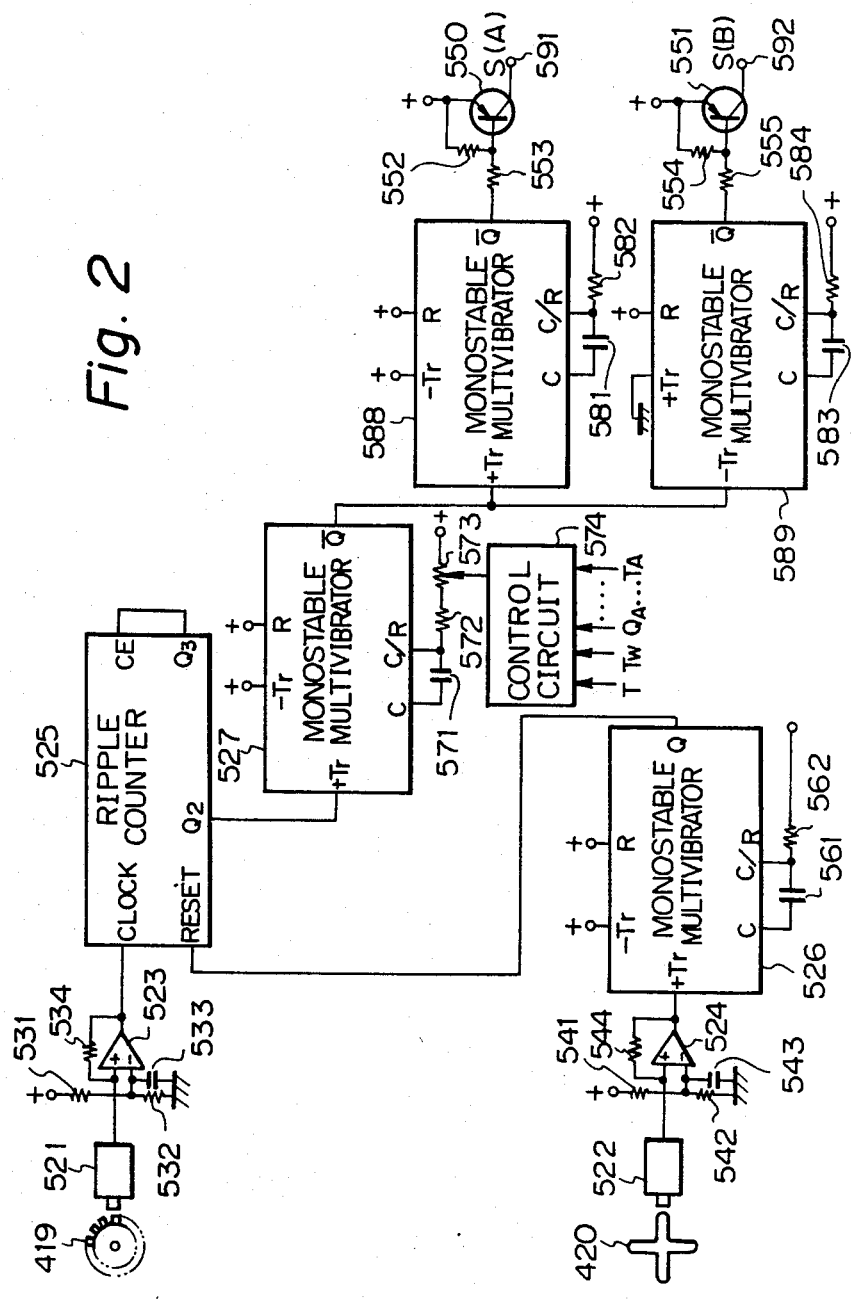
FIG. 2 is a circuit diagram of a gate trigger circuit of a thyristor of a driving circuit portion for the piezoelectric element.

FIG. 2 shows a gate trigger circuit for inputting trigger signals into the gates of thyristors 34 and 35 included in the driving circuit portion of the piezoelectric element 11. In FIG. 2, the numeral 419 stands for a disk having a plurality of teeth formed around the periphery thereof and rotating synchronously with the crankshaft of an engine (not shown), and the numeral 420 for a disk having four projections around the periphery thereof, the number of projections corresponding to the number of the cylinders of the engine, and the disk 420 rotating synchronously with the crankshaft of the engine. The numerals 521 and 522 represent transducers which detect the projections of disks 419 and 420, respectively, and convert them into electric signals. The numerals 523 and 524 represent comparators whose non-inversion input terminals are connected to the output terminals of transducers 521 and 522 to shape the output waveform into a rectangular wave.

The inversion input terminal of the comparator 523 is connected to a reference voltage via a resistance 531 and, further, grounded via a parallel connection including a resistance 532 and a capacitor 533. A resistance 534 is provided between the non-inversion input terminal and the output terminal of the comparator 523 in parallel with the comparator 523. The comparator 524 has a similar constitution and is provided with resistances 541, 542, and 544 and a capacitor 543. The numeral 526 represents a monostable multivibrator whose Tr(+) terminal is connected to the output terminal of the comparator 524.

The monostable multivibrator 526 outputs from its output terminal Q a signal having a specified pulse width which rises in response to the rise of the output signal sent out of the comparator 524, keeps the rise state for the period of time determined by the time constants of an outside capacitor 561 and an external resistance 562, and then falls. The numeral 525 represents a ripple counter, a terminal CLOCK of the ripple counter being connected to the output terminal of comparator 523, and a terminal RESET of said ripple counter being connected to the output terminal Q of monostable multivibrator 526.

The ripple counter 525 is so designed that it starts to count as soon as it is reset by the output signal of the monostable multivibrator 526, the number of rectangular wave signals sent out of the comparator 523 rises after the count of two, falls after the count of four, and clears the count after the count of five. The ripple counter 525 outputs its pulse signals from its output terminal $Q_2$. The numerals 527, 588, and 589 represent monostable multivibrators of the same kind as the monostable multivibrator 526. The terminal Tr(+) of monostable multivibrator 527 is connected to the output terminal $Q_2$ of ripple counter 525.

The monostable multivibrator 527 outputs from its output terminal $\overline{Q}$ a signal having a specified pulse width which falls in response to the rise of the output signal transmitted from the ripple counter 525, keeps the fall state for the period of time determined by the time constants of an external capacitor 571, an outside resistance 572, and an external variable resistance 573, and then rises. The external variable resistance 573 judges the conditions of the internal combustion engine according to signals (N, $T_W$, $Q_A$, ... $T_A$) from the sensors such as the rotation sensor, the water temperature sensor, the intake air amount sensor, or the intake air temperature sensor, and is varied by a control circuit 574 for controlling various driving circuits (not shown).

The output terminal $\overline{Q}$ of the monostable multivibrator 527 is connected to the terminals Tr(+) and Tr(−) of the monostable multivibrators 588 and 589 respectively. The monostable multivibrator 588 outputs from its output terminal $\overline{Q}$ a pulse signal which falls in response to a rise signal output from the output terminal $\overline{Q}$ of the monostable multivibrator 527, keeps the fall state for the period of time determined by the time constants of an external capacitor 581 and an outside resistance 582, and then rises.

The monostable multivibrator 589 outputs from its output terminal $\overline{Q}$ a pulse signal which falls in response to a fall signal output from the output terminal $\overline{Q}$ of the monostable multivibrator 527, keeps the fall state for the period of time determined by the time constants of an external capacitor 583 and an outside resistance 584, and then rises. The numerals 550 and 551 represent PNP transistors whose base terminals are connected to the output terminals $\overline{Q}$ of the monostable multivibrators 588 and 589 respectively through resistances 553 and 555.

Between the emitter and the base terminals of each of the transistors 550 and 551, there are provided resistances 552 and 554 in parallel with the transistors 550 and 551, respectively. Output signals from the output terminals $\overline{Q}$ of the monostable multivibrators 588 and 589 are inverted by the transistors 550 and 551 respectively and output as trigger signals S(A) and S(B) to be input into the gate terminals of the thyristors 34 and 35.

The operation of the gate trigger circuit shown in FIG. 2 is now explained according to the time chart in FIG. 3. The output of the transducer 521 detecting the teeth of the disk 419 is shaped by the comparator 523 into a waveform (1) shown in FIG. 3. On the other hand, the output of the transducer 522 detecting the projections of the disk 420 is shaped by the comparator 524 into a waveform (2) shown in FIG. 3. The output of the comparator 524 has been input into the terminal Tr(+) of the monostable multivibrator 526, and the output terminal Q of the monostable multivibrator 526 outputs a pulse signal having a specified pulse width. An outside capacitor 561 and an outside resistance 562 are so selected that the pulse width of the pulse output from the output terminal Q of the monostable multivibrator 526 becomes smaller than that output from the comparator 523.

A pulse signal from the output terminal Q of the monostable multivibrator 526 is input into the terminal RESET of the ripple counter 525. On the other hand, the output signal from the comparator 523 has been input into the terminal CLOCK of the ripple counter 525 so that a pulse signal (4) shown in FIG. 3 is obtained from the output terminal $Q_2$ of the ripple counter 525. A pulse signal from the output terminal $Q_2$ of the ripple counter 525 is input into the terminal Tr(+) of the monostable multivibrator 527. According to the input signal, a pulse signal having a specified pulse width is output from the output terminal $\overline{Q}$ of the monostable multivibrator 527. The waveform of the pulse signal from the output terminal $\overline{Q}$ of the monostable multivibrator 527 is as shown in (5) of FIG. 3. The pulse width of the pulse signal can be changed by an outside variable resistance 573.

The pulse signal from the output terminal $\overline{Q}$ of the monostable multivibrator 527 is input into the terminal Tr(+) of the monostable multivibrator 588 as well as into the terminal Tr(−) of the monostable multivibrator 589. As a result, pulse signals of (6) and (7) shown in FIG. 3 are output from the output terminal $\overline{Q}$ of the monostable multivibrator 588 and the output terminal $\overline{Q}$ of the monostable multivibrator 589, respectively. The pulse signal from the output terminal $\overline{Q}$ of the monostable multivibrator 588 is input into the base terminal of the PNP transistor 550 through a resistance 553, so that a trigger signal S(A), which is an inverted pulse signal from the output terminal $\overline{Q}$ of the monostable multivibrator 588, is supplied to the collector terminal of the PNP transistor 550.

In the same manner, a trigger signal S(B), which is an inverted pulse signal from the output terminal $\overline{Q}$ of the monostable multivibrator 589, is output to the collector terminal of the PNP transistor 551. The trigger signal S(A) is shown in (8) of FIG. 3, and the trigger signal S(B) in (9) of FIG. 3. The trigger signal S(A) synchronizes with the rise of the pulse signal from the output terminal $\overline{Q}$ of the monostable multivibrator 527, and the trigger signal S(B) synchronizes with the fall of the pulse signal from the monostable multivibrator 527.

As described later in detail, the pulse signal from the output terminal $\overline{Q}$ of the monostable multivibrator 527 is a control signal to spray fuel from the fuel injection outlet 19 of the fuel injection valve 1 while the fall state is kept for the period of time $\tau$ (seconds), the control signal being hereinafter called the "$\tau$ signal."

The operation of the driving circuit portion of the piezoelectric element 11 is now explained according to the time chart in FIG. 4.

The voltage of DC power source 31 (e.g., 12 V) is increased to about 300 V by the DC—DC converter 32 to charge the capacitor 33. The trigger signal S(A) sent out of the gate trigger circuit shown in FIG. 2 is input into the gate terminal of thyristor 34 through the pulse transformer 300 and a noise prevention circuit including a diode 301, resistances 303 and 304, and a capacitor 302. If the thyristor 34 is turned ON by the trigger signal S(A), a closed circuit is formed by the capacitor 33, thyristor 34, resonance coil 38, diode 37, and piezoelectric element 11 so that the piezoelectric device 11 is caused to have an LC resonance by the resonance coil 38 and the capacitive component of the piezoelectric element 11.

Thus, the current of half-sine wave as shown in (3) of FIG. 4 flows in the piezoelectric element 11, and the positive terminal voltage of piezoelectric device 11 rises to about 300 V within the time of the half-sine wave. Due to the LC resonance, the voltage of the piezoelectric element 11 usually becomes 600 V, i.e., two times the above-mentioned voltage.

However, the current flows to the cathode side of the thyristor 34 from the piezoelectric element 11 via the diode 36 to turn OFF the thyristor 34 when the positive terminal voltage of the piezoelectric element 11 becomes higher than the output voltage of the DC—DC converter 32 so that the diode 36 operates to equalize the output voltage of the DC—DC converter 32 and the positive terminal voltage of the piezoelectric element 11. As a result, the positive terminal voltage of the piezoelectric element 11 does not exceed 300 V, i.e., the thyristor 34 is turned OFF when the positive terminal voltage of the piezoelectric element 11 becomes 300 V to keep the piezoelectric element 11 in the state of 300 V.

After that, a trigger signal S(B) sent out of the gate trigger circuit shown in FIG. 2 is input into the gate terminal of the thyristor 35 through the pulse transformer 310 and a noise prevention circuit including the diode 311, resistances 313 and 324, and capacitor 312 to turn the thyristor 35 ON, thereby forming a closed circuit including the thyristor 35, resonance coil 38, diode 36, and piezoelectric element 11. The positive terminal voltage of the piezoelectric element 11 becomes 0 V within the time determined by the resonance coil 38 and the capacitive component of piezoelectric element 11. In the same manner as mentioned before, the diode 37 operates to turn the thyristor 35 OFF so that the applied voltage to the piezoelectric element 11 does not fall lower than 0 V.

The applied voltage to the piezoelectric element 11 is shown in (7) of FIG. 4.

The piezoelectric element 11 expands when the voltage is applied and contracts when the voltage is not applied. Accordingly, the needle valve 13 of the fuel injection valve shown in FIG. 1 closes the fuel injection outlet 19 when the piezoelectric element 11 expands due to the applied voltage and opens the fuel injection outlet 19 to cause the fuel to be injected due to the return force of the plate spring 14 when the applied force to the piezoelectric element 11 becomes zero. The amount of fuel to be injected is determined by the period of time the fuel injection outlet 19 is opened, i.e., the amount is determined by the signal $\tau$ mentioned above.

In the system shown in FIG. 1, the voltage applied to the piezoelectric element 11 is regulated by the output voltage (300 V) of the DC—DC converter 32 by means of the diode 36, and the diode 37 prevents the piezoelectric element 11 from receiving negative voltage. As a result, the stroke amount of the piezoelectric element 11 is stabilized, and the polarization loss of the piezoelectric element 11, which is caused by the negative voltage applied to the piezoelectric element 11, is prevented.

In addition, the voltage applied to the thyristors 34 and 35 is regulated by the output voltage of the DC—DC converter 32 so that the thyristors 34 and 35 are prevented from receiving abnormally high voltage.

Further, even if the thyristors 34 and 35 are simultaneously turned ON due to a mistrigger, the charge stored in the capacitor 33 does not flow at one time to the thyristors 34 and 35 by virtue of the resonance coil 38 inserted therebetween, thereby preventing the thyristors 34 and 35 from being destroyed by the differential value di/dt of the current.

In the driving circuit portion shown in FIG. 1, the voltage of the DC—DC converter 32 has been positive. The present invention, however, works even if such voltage is a negative voltage. In this case, it is necessary that the thyristors 34 and 35, diodes 36 and 37, and piezoelectric element 11 be connected to the opposite polarity in comparison with the positive case.

In the unit shown in FIG. 1, the piezoelectric element 11 has been applied for the actuator portion of the fuel injection valve. The location of the piezoelectric device, however, is not limited to that portion. The piezoelectric element 11 can be applicable for a fuel pump or devices using actuators which need a certain extent of stroke.

We claim:

1. A piezoelectric element driving device comprising:
a power supply circuit having a power source;
a first switching element connected to said power supply circuit for operating to generate a first set voltage in response to a first signal transmitted at predetermined intervals;
a second switching element connected to said power supply circuit for operating to generate a second set voltage in response to a second signal transmitted after a predetermined period of time upon completion of the operation of said first switching element;
a piezoelectric element connected to said first and second switching elements through rectifying devices for receiving the application of said first and second set voltages;
means for regulating said first and second set voltages by means of said rectifying devices provided between said first and second switching elements and said piezoelectric element; and
a resonance coil connected between connecting points of said first and second switching elements and said rectifying devices for effecting LC resonance in association with said piezoelectric element.

2. A piezoelectric element driving device according to claim 1, wherein said first and second switching elements are thyristors.

3. A device according to claim 1, further including an actuator for an internal combustion engine, said piezoelectric element being arranged within said actuator for controllably supplying fuel to the internal combustion engine.

4. A device according to claim 3, further comprising; a gate trigger circuit including: third-signal generating means for generating a third signal in synchronization with the rotation of the internal combustion engine; signal forming means for forming a pulse signal, having a predetermined pulse width, in response to said third signal; and first-and-second signal generating means for generating said first and second signals in synchronization with the rising edge and the falling edge of said pulse signal.

5. A device according to claim 4, wherein said signal forming means comprises pulse width decision means for deciding the pulse width of said pulse signal on the basis of operation parameters representing operation states of the internal combustion engine.

* * * * *